(12) United States Patent
Froniewski

(10) Patent No.: US 10,782,158 B1
(45) Date of Patent: Sep. 22, 2020

(54) CONTACTLESS ENCODER

(71) Applicant: Silego Technology, Inc., Santa Clara, CA (US)

(72) Inventor: Jozef Froniewski, Gilroy, CA (US)

(73) Assignee: Silego Technology, Inc., Santa Clara, CA (US)

( * ) Notice: Subject to any disclaimer, the term of this patent is extended or adjusted under 35 U.S.C. 154(b) by 105 days.

(21) Appl. No.: 16/138,240

(22) Filed: Sep. 21, 2018

Related U.S. Application Data

(60) Provisional application No. 62/561,621, filed on Sep. 21, 2017.

(51) Int. Cl.
*G01D 5/241* (2006.01)
*H01H 19/14* (2006.01)
*G01D 5/249* (2006.01)

(52) U.S. Cl.
CPC ......... *G01D 5/2417* (2013.01); *G01D 5/2415* (2013.01); *G01D 5/2497* (2013.01); *H01H 19/14* (2013.01); *G01D 5/241* (2013.01)

(58) Field of Classification Search
CPC .. G01D 5/00; G01D 5/12; G01D 5/14; G01D 5/24; G01D 5/241; G01D 5/2417; G01D 5/2415; G01D 5/2497; H01H 19/00; H01H 19/02; H01H 19/10; H01H 19/14; G01R 27/00; G01R 27/02; G01R 27/26; G01R 27/2605; G06F 3/00; G06F 3/01; G06F 3/03; G06F 3/041; G06F 3/044; G06F 3/0447

USPC ......... 324/600, 649, 658, 661, 662; 340/1.1, 340/11.1; 702/127, 155, 158, 163; 73/1.01, 1.23, 1.79, 114.26, 114.28, 73/114.36, 314
See application file for complete search history.

(56) References Cited

U.S. PATENT DOCUMENTS

| | | | | | |
|---|---|---|---|---|---|
| 3,766,544 | A | * | 10/1973 | Batz | G01D 5/2412 341/7 |
| 5,554,981 | A | * | 9/1996 | Koch | G01D 5/24 324/457 |
| 5,780,795 | A | * | 7/1998 | O'Reilly | B60Q 1/1476 200/61.54 |
| 6,380,642 | B1 | * | 4/2002 | Buchner | B60R 25/02153 307/10.3 |
| 7,420,376 | B2 | * | 9/2008 | Tola | G01D 5/2415 324/661 |
| 2004/0164731 | A1 | * | 8/2004 | Moreno | F16H 59/105 324/207.22 |

* cited by examiner

*Primary Examiner* — Hoai-An D. Nguyen
(74) *Attorney, Agent, or Firm* — Van Pelt, Yi & James LLP

(57) ABSTRACT

A contactless encoder is disclosed. The encoder comprises a selector configured to select one of a plurality of states associated with the encoder. The encoder furthermore comprises an integrated circuit comprising a finite state machine configured to detect a currently selected state by the selector and generate an output signal corresponding to the detected currently selected state, wherein the currently selected state is detected based on a capacitive coupling between the selector and a portion of the encoder associated with the currently selected state.

38 Claims, 3 Drawing Sheets

US 10,782,158 B1

CONTACTLESS ENCODER

CROSS REFERENCE TO OTHER APPLICATIONS

This application claims priority to U.S. Provisional Patent Application No. 62/561,621 entitled CONTACTLESS ROTARY ENCODER filed Sep. 21, 2017, which is incorporated herein by reference for all purposes.

BACKGROUND OF THE INVENTION

Typical mechanical encoders or switches stop working after a prescribed period of time due to normal wear and tear resulting from friction or resistance between moving parts and especially when deployed in outdoor environments where contact oxidation may furthermore be a concern. Thus, a more robust encoder design is needed.

BRIEF DESCRIPTION OF THE DRAWINGS

Various embodiments of the invention are disclosed in the following detailed description and the accompanying drawings.

DETAILED DESCRIPTION

Figure 1B:
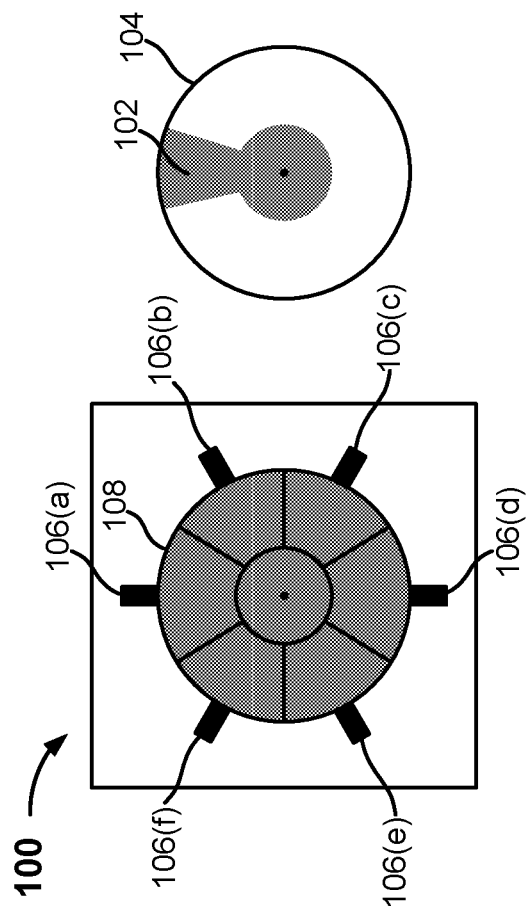
FIG. 1B illustrates an inside view of an embodiment of an encoder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A high reliability, contactless encoder based on a finite state machine is disclosed herein. In various embodiments, the disclosed encoder may comprise any appropriate mechanical configuration or layout. For example, the encoder may comprise a linear encoder or a rotary encoder. In some embodiments, the encoder is configured to operate as a switch, such as a linear switch or a rotary switch. As further described herein, operation of the disclosed contactless encoder or switch is based on a finite state machine. A finite state machine is in exactly one of a finite number of possible states at any given time. Thus, a finite state machine employed with an encoder or switch ensures that only one encoder state or switch position/setting is selected at any given time. In some embodiments, the disclosed encoder or switch includes an integrated circuit that provides the finite state machine functionality.

In the following description, the disclosed techniques are described with respect to a prescribed embodiment of a mechanical encoder. However, the described embodiment merely serves as an example to describe the invention. Generally, the disclosed techniques may be employed with respect to any other appropriate encoder or switch configurations having any number of associated states.

Figure 1A:
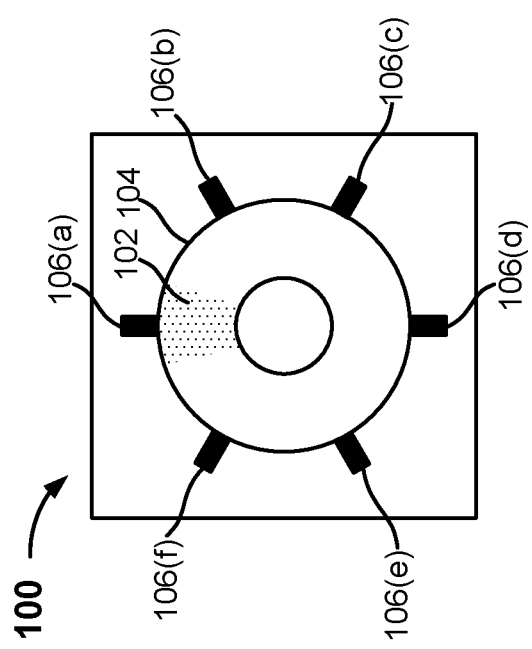
FIG. 1A illustrates a top view of an embodiment of an encoder.

FIGS. 1A-1B are high level diagrams illustrating an embodiment of an encoder 100. Specifically, in the example of FIGS. 1A-1B, encoder 100 comprises a mechanical rotary switch having six possible states, positions, or settings.

FIG. 1A illustrates a top view of rotary switch 100. Selector 102 (i.e., the underlying wiper represented by the dotted portion in FIG. 1A) of switch 100 is mechanically moved or rotated using outer control or knob 104 to select any one of six possible positions or states 106(a)-(f) associated with switch 100. In some embodiments, switch 100 includes mechanical detents so that feedback such as an audible 'click' and/or a tactile or haptic response is provided when selector 102 is centered at each possible state or position 106(a)-(f). In the example of FIG. 1A, selector 102 is positioned to select state 106(a).

FIG. 1B illustrates an inside view of rotary switch 100. That is, in FIG. 1B, knob 104 has been removed from switch 100 and placed upside down to the side. Plate 108 of switch 100 is situated below knob 104. As depicted, plate 108 is divided into six portions (i.e., sector pads) associated with the six states or positions 106(a)-(f) of switch 100. The inside surface of knob 104 includes selector 102. When selector 102 aligns with a prescribed sector pad of plate 108, a corresponding state or position is selected.

In some embodiments, selector 102 and plate 108 comprise a conductive material, e.g., a metal such as copper. When in the configuration depicted in FIG. 1A, selector 102 and the portion of plate 108 associated with the currently selected state are capacitively coupled. Specifically, a first capacitor is formed from the central circular portions of selector 102 and plate 108. Moreover, a second capacitor is formed when selector 102 and a prescribed sector pad align or at least partially align.

In some embodiments, switch 100 is contactless, i.e., the plates of the aforementioned first and second capacitors are not in direct contact. In some such cases, knob 104 is positioned above plate 108 in a manner such that selector 102 hovers over plate 108, effectively creating an air gap between selector 102 and plate 108. In some cases, an insulator such as plastic may be employed to cover the entire conductive surface comprising plate 108 and/or selector 102. Generally, any one or more dielectric materials may be employed between selector 102 and plate 108.

The layouts of the selector and the sector pads may be optimized to maximize signal strength. In some cases, switch 100 may be designed to have symmetric sector pads (i.e., pads having the same geometry), for example, to ensure a more robust design in which all pads receive noise or interference in common mode. In some cases, the layout and dimensions of the selector and sector pads may be selected such that there is no overlap of two pads at the same time for a given selector position. Good sensitivity may be achieved in a board layout by having interconnect traces to the pads that are very narrow and equal in length to each other so that the total capacitance of each sector pad is the same or approximately the same. The sector pads of switch 100 interface with an integrated circuit as described next with respect to FIGS. 2A-2B.

Figure 2A:
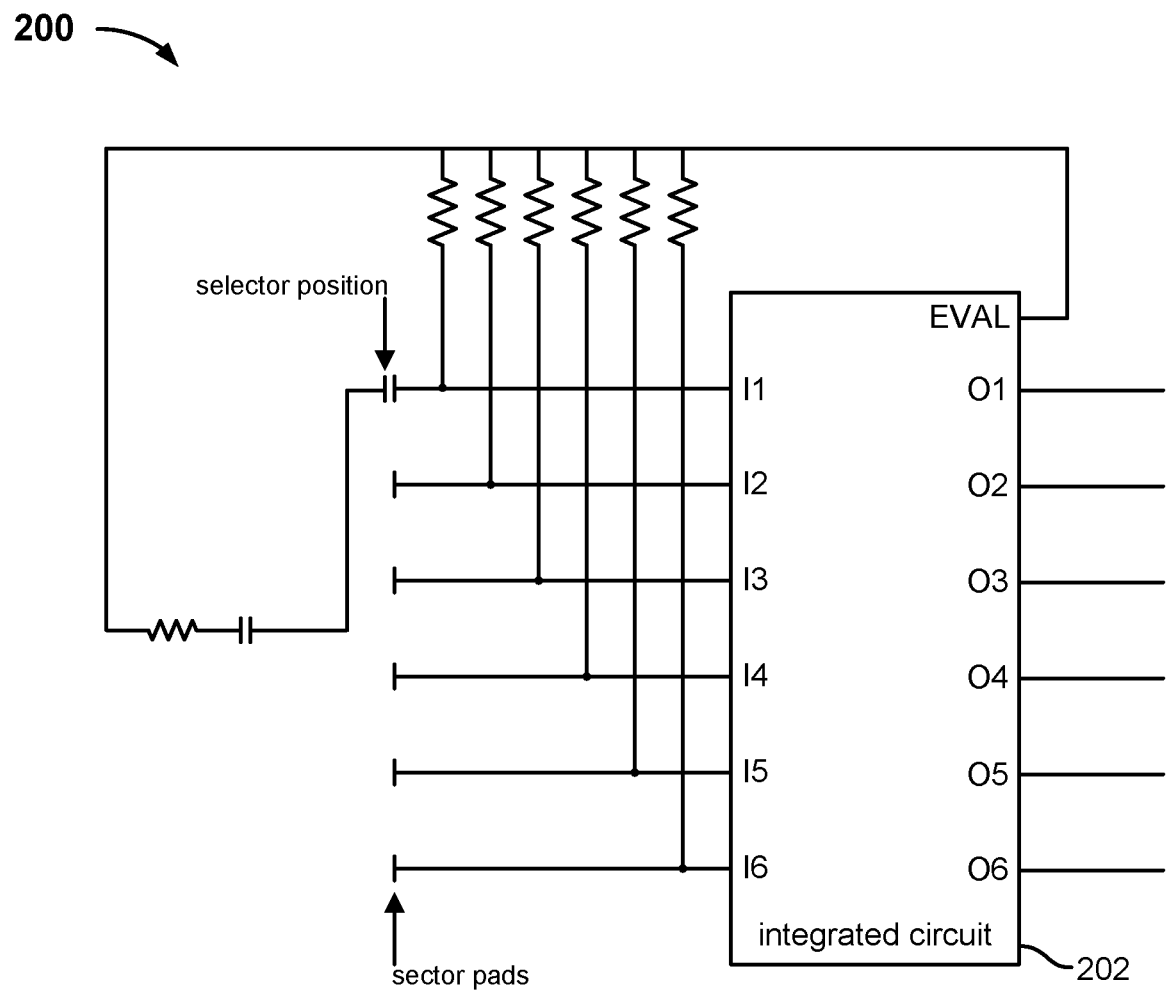
FIG. 2A is a high level circuit diagram of an embodiment of an encoder.

FIG. 2A is a high level circuit diagram of an embodiment of an encoder 200. For example, encoder 200 may comprise rotary switch 100 of FIGS. 1A-1B. A current state, position, or setting of the encoder or switch is determined using a finite state machine. In the given example, the finite state machine functionality is provided by integrated circuit 202.

Integrated circuit 202 independently runs or operates to detect the state, position, or setting of encoder or switch 200. That is, integrated circuit 202 operates on its own independently of the currently selected state, position, or setting of encoder or switch 200 or changes thereto. Generally, integrated circuit 202 is configured to generate an output signal that initiates detection, receive input signals from each sector pad of the encoder or switch, interpret each sector pad input signal using a finite state machine and associated arbitration circuitry to determine a single valid state, and present as output an output signal associated with the detected state.

More specifically, an output signal of integrated circuit 202, i.e., EVAL in FIG. 2A, is employed to facilitate detection of the current state, position, or setting of encoder or switch 200 periodically or at prescribed sampling intervals. Output signal EVAL may comprise, for example, a clock signal or an oscillator output. In various embodiments, output signal EVAL may be configured to sample state at a rate that comprises an appropriate response time for a given application. A faster sampling rate results in a faster response time but at the expense of greater power consumption. A low power operation mode may be achieved using a slower sampling rate in applications in which a slower response time is acceptable.

As depicted in FIG. 2A, output signal EVAL slowly pulls up each sector pad through a (high-value) external resistor. In various embodiments, the external resistors may have the same or different values. For instance, in one embodiment, the external resistors comprise 100 kohm resistors. Output signal EVAL is furthermore capacitively coupled to the selector which drives the rising edge of the selected sector pad faster than all the others. A finite state machine comprising integrated circuit 202 evaluates input signals on input pins (i.e., I1-I6 in FIG. 2A) of the integrated circuit to determine which rising edge arrives first, and the result is latched. An output signal associated with a detected currently selected state is output via a corresponding output pin (i.e., one of O1-O6 in FIG. 2A) of integrated circuit 202.

Figure 2B:
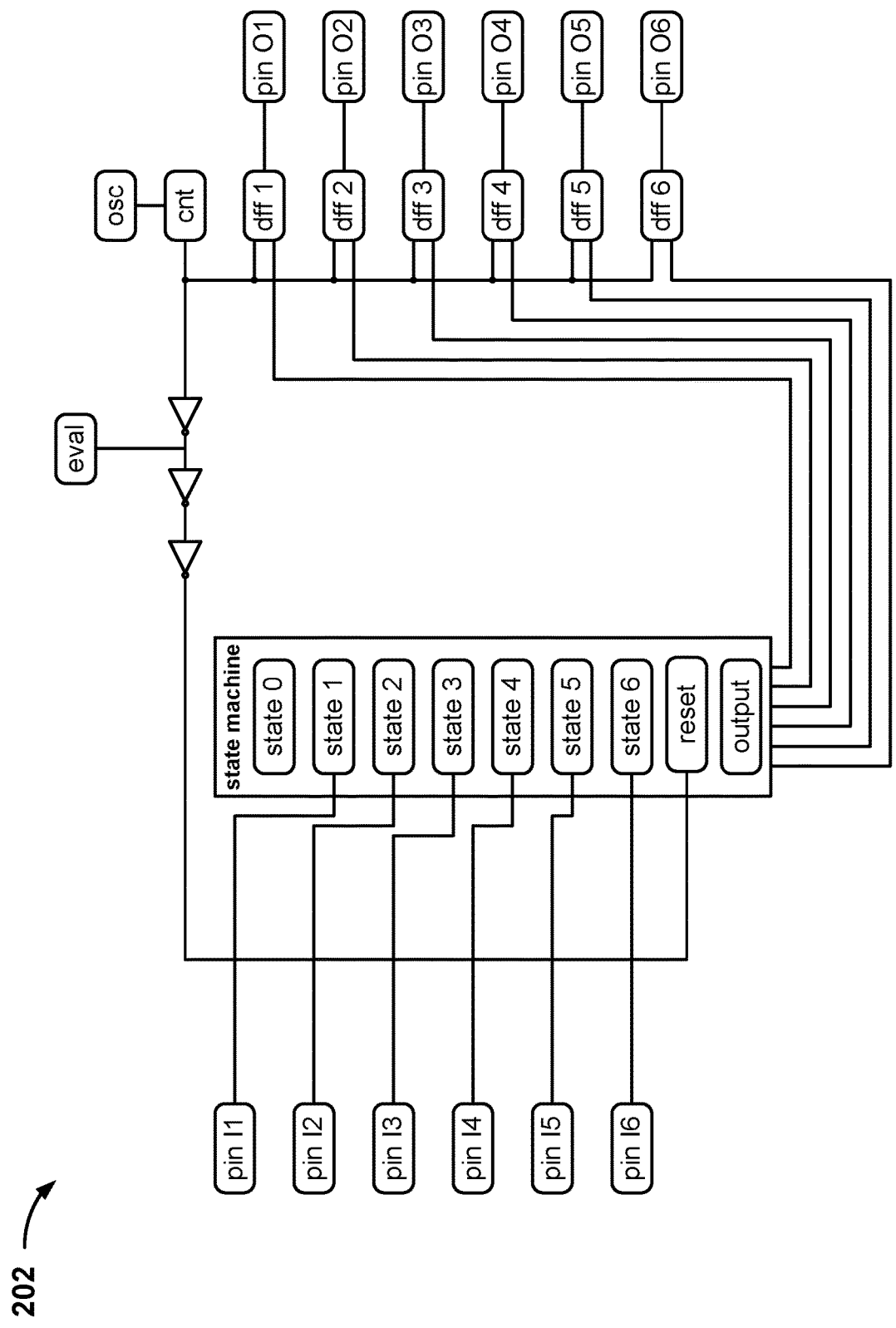
FIG. 2B is a high level circuit diagram of an embodiment of an integrated circuit comprising an encoder.

FIG. 2B is a high level circuit diagram of an embodiment of an integrated circuit 202 comprising a state machine. In some embodiments, the state machine of integrated circuit 202 comprises a finite state machine such as an asynchronous state machine. In the given example, output signal EVAL is generated from a (low frequency) oscillator that is further divided down using a counter, and a slightly delayed copy of EVAL is used as a reset for the state machine with each cycle or iteration of detection. The reset ensures that the state machine starts from a reset state, i.e., state 0 in the given example. After a reset, the state machine monitors the EVAL signal at the sector pads or portions associated with the various states of an encoder, which are each connected to an input pin (i.e., pins I1-I6 in FIG. 2B) of integrated circuit 202. In this example, only the earliest rising edge will cause a state transition out of state 0. Any subsequent rising edges from other sector pads are ignored since only one state transition is possible. The input signal from a selected sector pad will have a faster rise time relative to input signals from unselected sector pads due to capacitive coupling between the selector and the selected sector pad. Even in the event of two simultaneous rising edges, arbitration circuitry associated with the state machine allows only one of the states to be valid. Each of the state machine output states corresponds to each of the sector pads. D flip-flop latches hold the state machine result steady so that there is no switching of the final output during a reset. An output signal associated with a detected state is output via a corresponding output pin (i.e., one of pins O1-O6 of FIG. 2B).

The disclosed techniques comprise a low power and robust solution for a high reliability encoder that may be used with respect to any of a variety of applications such as outdoor timers, lighting controllers, peak flow meters, or any other applications that require stable, long term performance such as outdoor applications subject to environmental effects including moisture, dust, temperature extremes, etc. The contactless design results in a (e.g., wiper-based) mechanical encoder to be immune to contact oxidation and wear. Moreover, the disclosed design continues to operate regardless of whether it is fabricated as contactless (i.e., capacitively coupled) and later degrades to direct connection or fabricated as direct connection and later degrades to contactless (i.e., capacitively coupled).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An encoder, comprising:
a selector configured to select one of a plurality of states associated with the encoder; and
an integrated circuit comprising a finite state machine configured to detect a currently selected state by the selector and generate an output signal corresponding to the detected currently selected state;
wherein the currently selected state is detected based on a capacitive coupling between the selector and a portion of the encoder associated with the currently selected state and wherein the integrated circuit outputs an evaluation signal that initiates detection of encoder state at a prescribed sampling rate and that resets the finite state machine with each detection iteration.

2. The encoder of claim 1, wherein the integrated circuit operates independently of the selector.

3. The encoder of claim 1, wherein the integrated circuit operates on its own according to the prescribed sampling rate and independently of the currently selected state.

4. The encoder of claim 1, wherein the prescribed sampling rate is based at least in part on a clock signal.

5. The encoder of claim 1, wherein the prescribed sampling rate is based at least in part on an oscillator output.

6. The encoder of claim 1, wherein the encoder continues to operate if the capacitive coupling degrades to a direct connection.

7. The encoder of claim 1, wherein the integrated circuit comprises input pins configured to receive input signals associated with the plurality of states of the encoder.

8. The encoder of claim 1, wherein to detect comprises to detect which integrated circuit input signal rising edge arrives first.

9. The encoder of claim 1, wherein the output signal corresponding to the detected currently selected state is latched.

10. The encoder of claim 1, wherein portions of the encoder associated with the plurality of states have the same geometry.

11. The encoder of claim 1, wherein the selector and portions of the encoder associated with the plurality of states comprise a conductive material.

12. The encoder of claim 1, wherein the selector and portions of the encoder associated with the plurality of states are not in direct contact.

13. The encoder of claim 1, wherein the encoder is contactless.

14. The encoder of claim 1, wherein the encoder comprises a linear encoder.

15. The encoder of claim 1, wherein the encoder comprises a rotary encoder.

16. The encoder of claim 1, wherein the encoder comprises a switch.

17. The encoder of claim 1, wherein the plurality of states associated with the encoder comprises switch positions or settings.

18. The encoder of claim 1, wherein the finite state machine comprises an asynchronous state machine.

19. The encoder of claim 1, wherein the encoder comprises a mechanical encoder.

20. A method, comprising:
   configuring a selector to select one of a plurality of states associated with an encoder; and
   configuring an integrated circuit comprising a finite state machine to detect a currently selected state by the selector and generate an output signal corresponding to the detected currently selected state;
   wherein the currently selected state is detected based on a capacitive coupling between the selector and a portion of the encoder associated with the currently selected state and wherein the integrated circuit outputs an evaluation signal that initiates detection of encoder state at a prescribed sampling rate and that resets the finite state machine with each detection iteration.

21. The method of claim 20, wherein the integrated circuit operates independently of the selector.

22. The method of claim 20, wherein the integrated circuit operates on its own according to the prescribed sampling rate and independently of the currently selected state.

23. The method of claim 20, wherein the prescribed sampling rate is based at least in part on a clock signal.

24. The method of claim 20, wherein the prescribed sampling rate is based at least in part on an oscillator output.

25. The method of claim 20, wherein the encoder continues to operate if the capacitive coupling degrades to a direct connection.

26. The method of claim 20, wherein the integrated circuit comprises input pins configured to receive input signals associated with the plurality of states of the encoder.

27. The method of claim 20, wherein to detect comprises which integrated circuit input signal rising edge arrives first.

28. The method of claim 20, wherein the output signal corresponding to the detected currently selected state is latched.

29. The method of claim 20, wherein portions of the encoder associated with the plurality of states have the same geometry.

30. The method of claim 20, wherein the selector and portions of the encoder associated with the plurality of states comprise a conductive material.

31. The method of claim 20, wherein the selector and portions of the encoder associated with the plurality of states are not in direct contact.

32. The method of claim 20, wherein the encoder is contactless.

33. The method of claim 20, wherein the encoder comprises a linear encoder.

34. The method of claim 20, wherein the encoder comprises a rotary encoder.

35. The method of claim 20, wherein the encoder comprises a switch.

36. The method of claim 20, wherein the plurality of states associates with the encoder comprises switch positions or settings.

37. The method of claim 20, wherein the finite state machine comprises an asynchronous state machine.

38. The method of claim 20, wherein the encoder comprises a mechanical encoder.

* * * * *